United States Patent
Smith (10) Patent No.: US 9,221,078 B2
(45) Date of Patent: Dec. 29, 2015

(54) GASKET FOR LOCATING AND SEALING A SCREEN IN A ROUND SEPARATOR

(75) Inventor: Joseph L. Smith, Cincinnati, OH (US)

(73) Assignee: M-I L.L.C., Houston, TX (US)

( * ) Notice: Subject to any disclaimer, the term of this patent is extended or adjusted under 35 U.S.C. 154(b) by 877 days.

(21) Appl. No.: 13/290,330

(22) Filed: Nov. 7, 2011

(65) Prior Publication Data

US 2012/0125823 A1     May 24, 2012

Related U.S. Application Data

(60) Provisional application No. 61/415,590, filed on Nov. 19, 2010.

(51) Int. Cl.
    *B07B 1/00*       (2006.01)
    *B07B 1/38*       (2006.01)
    *B07B 1/46*       (2006.01)
    *F16J 15/02*     (2006.01)

(52) U.S. Cl.
    CPC ... *B07B 1/38* (2013.01); *B07B 1/46* (2013.01); *F16J 15/025* (2013.01)

(58) Field of Classification Search
    USPC .................. 209/363, 323, 405, 309; 277/644
    See application file for complete search history.

(56) References Cited

U.S. PATENT DOCUMENTS

| | | | | |
|---|---|---|---|---|
| 3,029,946 A | * | 4/1962 | Wright, Jr. et al. | 209/405 |
| 3,035,700 A | * | 5/1962 | McCausland | 209/405 |
| 3,463,315 A | * | 8/1969 | Blackwell et al. | 209/323 |
| 7,721,896 B2 | * | 5/2010 | Mainwaring et al. | 209/405 |
| 7,913,853 B2 | * | 3/2011 | DeCenso et al. | 209/405 |
| 2009/0159507 A1 | * | 6/2009 | Mainwaring et al. | 209/366 |

FOREIGN PATENT DOCUMENTS

WO     2006119208 A1     11/2006

OTHER PUBLICATIONS

Combined Search and Examination Report issued in GB1119267.1 on Mar. 13, 2012, 4 pages.
Examination Report issued in GB1119267.1 on Dec. 5, 2012, 2 pages.
Examination Report issued in GB1119267.1 on Mar. 11, 2013, 3 pages.
Combined Search and Examination Report issued in GB1219918.8 on Dec. 5, 2012, 4 pages.
Examination Report issued in GB1219918.8 on Mar. 11, 2013, 3 pages.
Examination Report issued in GB1119267.1 on Jul. 16, 2013, 3 pages.
Examination Report issued in GB1219918.8 on Jul. 16, 2013, 3 pages.

\* cited by examiner

*Primary Examiner* — Terrell Matthews (57) ABSTRACT

A gasket for aligning and sealing a screen in a round separator includes a deformable annular wall having a first lobe at a top end, a second lobe at a bottom end, an exterior surface, and an interior surface from which an upper lip and a lower lip project inward to generally define a U-shaped channel, wherein the deformable annular wall, the upper lip, and the lower lip together have a pi-shaped cross-section.

24 Claims, 5 Drawing Sheets

GASKET FOR LOCATING AND SEALING A SCREEN IN A ROUND SEPARATOR

CROSS-REFERENCE TO RELATED APPLICATIONS

This application claims the benefit of the following application under 35 U.S.C. 119(e): U.S. Provisional Application Ser. No. 61/415,590 filed on Nov. 19, 2010, incorporated by reference in its entirety herein.

FIELD

Embodiments of the present invention generally relate to a gasket for sealing a screen between separator housing members.

BACKGROUND

Round separator systems are used in industry for the separation of materials, both wet and dry. A separator system typically functions by first introducing a flow of material to a porous element such as a screen usually made of woven wire mesh, for example. The flow of material is separated into two streams, one containing material that passes through the screen, the other containing material that is rejected by the screen (e.g., oversized material). A drive mechanism may be operatively coupled with a housing of the separator to produce a vibrating motion that serves to put the material on the screen in motion until it either passes through or is pushed off the screen at the periphery thereof.

Such separator systems may utilize screens in a circular form with the screen tensioned at its perimeter on an annular-shaped screen frame which is typically a metallic ring. The separator housing can be vibratory or fixed and, when vibratory, supported by a variety of means such as springs, bushings or links (see FIG. 1A, described in more detail below). The separator housing is laterally divided into a plurality of cylindrical housing members that are configured to fit together with the screen frame positioned between adjacent housing members. Each of the housing members has a vertically-oriented cylindrical wall terminating in a radially extending flange at one or both ends of the cylindrical wall. The flanges of adjacent housing members are adapted to be brought into close proximity and mutually aligned to define a seat therebetween for holding the screen frame (see FIG. 1B, described in more detail below). A gasket having a U-shaped cross-section is normally placed around a flange formed along the circumference of the screen frame to provide better sealing ability between the screen frame and the flanges of the adjacent housing members. The flanges of the adjacent housing members are typically non-planar and shaped to accommodate the flange of the screen frame and the surrounding gasket as well as to prevent shifting of the screen or misalignment of adjacent housing members during operation (e.g., vibration) of the separator. An annular clamp band having a generally U-shaped cross-section is positioned over the flanges of the adjacent housing members to tighten and fixedly assemble the screen and gasket between the adjacent housing members.

By far the most common failure mode for separator systems is the failure of the porous element. Screens, for example, are typically made of wire mesh or finely woven wire cloth drawn taut by the screen frame. Failure is caused by numerous factors such as wear and fatigue failure. Such failures typically occur as breaks in the screening media itself resulting in a damaged screen. Such breaks may manifest themselves as tears (i.e., a series of mutually adjacent broken wires), punctures (i.e., tears in two directions) or holes (i.e., missing portions of the screening material). Once the screen has failed, the function of a separating system is compromised. At a minimum, it can no longer be relied upon to reject all oversized material because such material can now pass through the break in the screen. As a result, screen frames having pre-tensioned screens are frequently replaced in order to maintain a properly operating separator.

However, frequent replacement of screens which are pre-tensioned on formed screen frames is expensive. In order to provide adequate sealing at the screen interface between adjacent housing members of a conventional separator, sophisticated or proprietary metal forming equipment is typically required to shape and form the various components including the non-planar flanges of the housing members, the flange of the screen frame, and the U-shaped annular clamp band. Unfortunately, the sophisticated metal forming equipment is expensive. Furthermore, in some countries the sophisticated metal forming equipment is not available and, consequently, the housing members, screen frames and clamps must be imported which is both time consuming and costly. To economically employ round separators in these countries, these components need to be more simply shaped to allow fabrication of these parts in local machine shops without the aid of expensive or proprietary metal forming equipment.

Therefore, to reduce production and/or operating costs of round separators, a need exists to develop a gasket that may be utilized to seal the interface of a screen frame and separator housing members which can be economically fabricated without the aid of expensive or proprietary metal forming equipment.

SUMMARY

In one aspect, the invention relates to a gasket for aligning and sealing a screen in a round separator, including a deformable annular wall having a first lobe at a top end, a second lobe at a bottom end, an exterior surface, and an interior surface from which an upper lip and a lower lip project inward to generally define a U-shaped channel, wherein the deformable annular wall, the upper lip, and the lower lip together have a pi-shaped cross-section.

In another aspect, the invention relates to a gasket sealing system for aligning and sealing a screen in a round separator, including a gasket comprising a deformable annular wall having a first lobe at a top end, a second lobe at a bottom end, an exterior surface, and an interior surface from which an upper lip and a lower lip project inward to generally define a U-shaped channel, wherein a top surface of the upper lip intersects the first lobe at an angle greater than about 90 degrees, and wherein a bottom surface of the lower lip intersects the second lobe at an angle greater than about 90 degrees; a screen having a screen frame disposed within the U-shaped channel of the gasket; an upper housing member having a first flange disposed above and generally parallel to the top surface of the upper lip of the gasket; and a lower housing member having a second flange disposed below and generally parallel to the bottom surface of the lower lip of the gasket.

In yet another aspect, the invention relates to a gasket sealing system for aligning and sealing a screen in a round separator, including a gasket comprising a deformable annular wall having a first lobe at a top end, a second lobe at a bottom end, an exterior surface, and an interior surface from which an upper lip and a lower lip project inward to generally define a U-shaped channel, wherein the deformable annular wall, the upper lip, and the lower lip together have a pi-shaped cross-section; a screen having a screen frame disposed within the U-shaped channel of the gasket; an upper housing member having a first flange disposed above and generally parallel to a top surface of the upper lip of the gasket; and a lower housing member having a second flange disposed below and generally parallel to a bottom surface of the lower lip of the gasket.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Figure 1A:
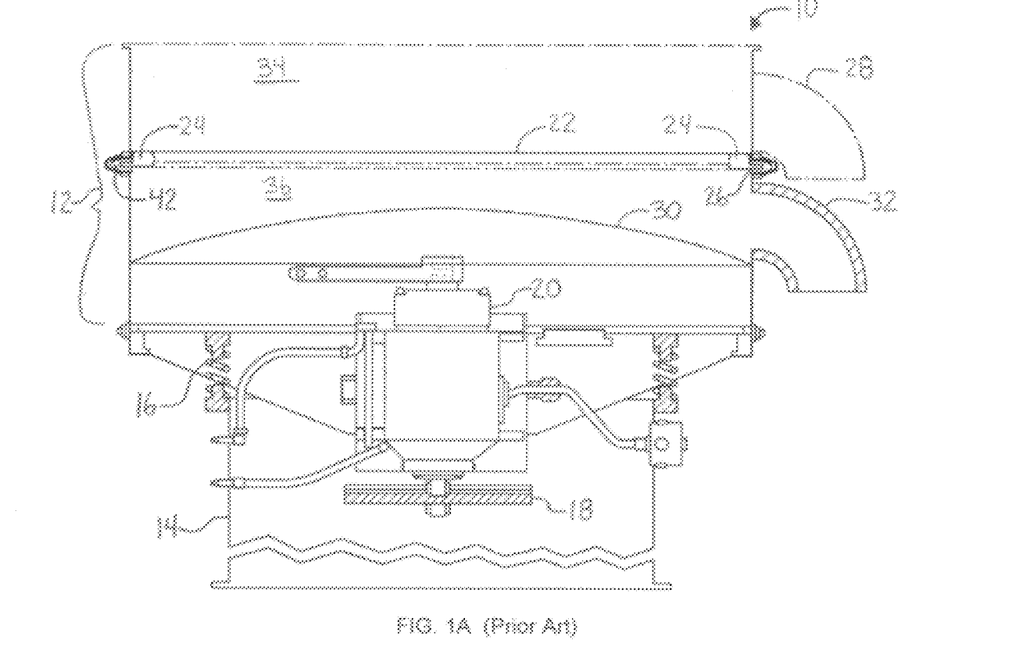
FIG. 1A is a partial cross-sectional view of a conventional vibratory round separator.

A gasket in accordance with the present invention and benefits thereof may be better understood by first describing the seal arrangement of a conventional screen within a conventional vibratory round separator. FIG. 1A schematically depicts the basic components of a conventional vibratory round separator, generally designated as 10. The separator 10 includes a cylindrical housing 12 which is elastically mounted to a base 14 on springs 16. A vibration generator 18 driven by a motor 20 causes the elastically mounted separator housing 12 to vibrate at a desired frequency and amplitude for material screening or filtering. A porous element or a screen 22 extends horizontally across the interior of the separator housing 12 to separate material deposited thereon by particle size and/or other selected characteristics. The screen 22 includes a screen frame 24 at the perimeter of the screen 22. The screen frame 24 is typically a formed metal ring having a flange 26 formed along the circumference of the screen frame 24 for fastening the screen within the housing 12. Additionally, a screen cloth (not shown) may be bonded to the screen frame 24 in a taut state. During operation of the separator 10, oversize particles of the separated material may exit the separator 10 via an oversize discharge outlet 28 present above the screen 22, while the undersize particles that pass through the screen 22 fall onto a domed manifold 30 which feeds an undersize discharge outlet 32 present below the screen 22.

Figure 1B:
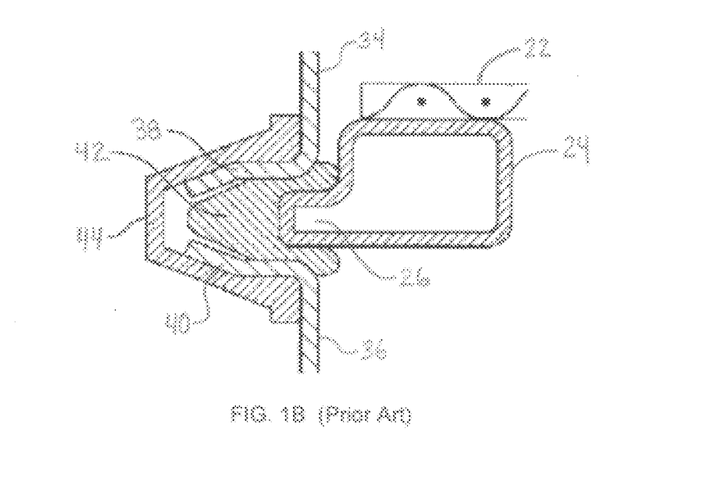
FIG. 1B is a close-up cross-sectional view of a conventional gasket disposed on a conventional screen frame between adjacent housing members of the conventional vibratory round separator depicted in FIG. 1A.

The cylindrical housing 12 is laterally divided into at least two cylindrical-housing members 34 and 36. The horizontally-oriented screen 22 is located between adjacent housing members 34 and 36. Each of the housing members 34, 36 has a vertically-oriented cylindrical wall with an outwardly extending radial flange 38, 40, respectively, as illustrated in FIG. 1B. FIG. 1B depicts the seal arrangement and construction of the adjacent housing members 34, 36 about the screen frame 24. The flanges 38, 40 of adjacent housing members are adapted to be brought into close proximity and mutually aligned to define a seat therebetween for holding the flange 26 of the screen frame 24. Gaskets are typically used at the interface of a screen frame and adjacent housing members to form an adequate seal therebetween. As shown, a gasket 42 having a generally U-shaped cross-section is positioned around the flange 26 to provide a better sealing effect at the interface between the flange 26 of the screen frame and the flanges 38, 40 of the adjacent housing members 34, 36. Each of the flanges 38, 40 of the adjacent housing members are typically formed to have a non-planar and angular shape adapted not only to approximate an outer perimeter of the gasket 42 for increasing the contact area and, hence, the sealing effect therebetween, but also to prevent lateral (i.e., horizontal) shifting of the screen 22 or misalignment of the adjacent housing members 34, 36 during operation (e.g., vibration) of the separator. An annular clamp band 44 having a generally U-shaped cross-section is positioned over the flanges 38, 40 of the adjacent housing members to tighten the seal arrangement and fixedly assemble the screen flange 26 between the adjacent housing members 34, 36.

As previously mentioned in the Background section, by far the most common failure mode for separator systems is the failure of the porous element or screen. Screens 22 which are typically made of finely woven wire cloth drawn taut by the screen frame 24 are particularly susceptible to damage or failure. Screen failure may be caused by numerous factors (e.g., wear, fatigue) that typically result in breaks such as tears, punctures, and/or holes in the screening media itself. Once the screen has failed, the function of a separating system is compromised. Consequently, screen frames having pretensioned screens are frequently replaced in order to maintain a properly operating separator.

However, frequent replacement of screens having pre-tensioned wire mesh or cloth on formed screen frames is expensive, as previously mentioned in the Background section. In order to provide adequate sealing at the screen interface between adjacent housing members 34, 36 of a conventional separator 10, sophisticated metal forming equipment is typically used to shape and form the various components including the non-planar flanges 38, 40 of the housing members, the flange 26 of the screen frame, and the U-shaped annular clamp band 44. Unfortunately, sophisticated metal forming equipment is expensive. Furthermore, in some countries the sophisticated metal forming equipment is not available and, consequently, the housing members, screen frames and clamps must be imported which is both time consuming and costly. To economically employ round separators in these countries, these components need to be more simply shaped to allow fabrication of these parts in local machine shops without the aid of expensive or proprietary metal forming equipment.

In contrast to the sealing arrangement described above with respect to FIGS. 1A and 1B, a gasket disclosed hereinafter may be utilized in a sealing arrangement that advantageously permits the fabrication of more simply shaped screen frames (e.g., screen frames having pre-tensioned screen mesh) and separator housing members which can be relatively cheaply fabricated without the aid of expensive or proprietary metal forming equipment otherwise normally used in the fabrication of conventional formed screen frames and housing members. Those skilled in the art will recognize that vibratory screening separator systems, nonvibratory screening separator systems, and other filtration systems employing a porous element (e.g., screen) can be more economically fabricated and/or operated by incorporating the gasket disclosed herein for sealing the porous element employed for material separation.

Figure 2A:
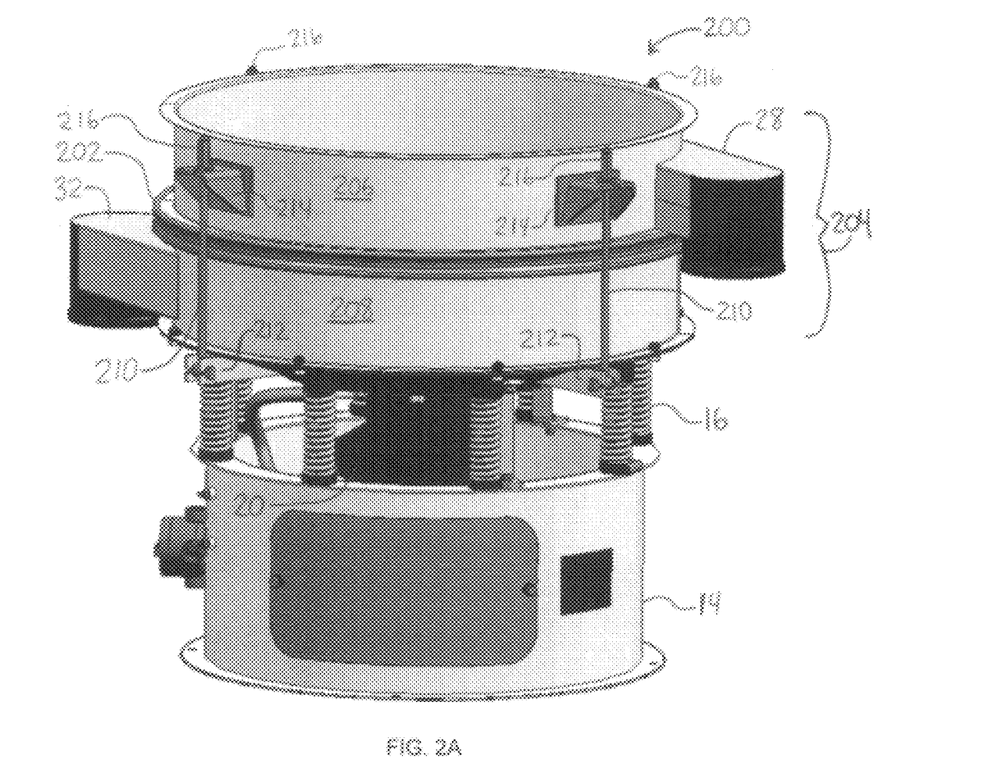
FIG. 2A is a perspective view of a gasket on a screen disposed within a vibratory round separator, in accordance with an embodiment of the present invention.

FIG. 2A is a perspective view of the exterior of a vibratory round separator 200 employing a gasket 202 for sealing a screen (not shown) therein, in accordance with one embodiment of the present invention. The separator 200 may have many of the same components (designated by the same reference numbers) as the separator 10 described above with the respect to FIG. 1A. In one example, illustrated in FIG. 2A, the separator 200 includes a cylindrical housing 204 which is elastically mounted to a base 14 on springs 16. The cylindrical housing 204 is laterally divided into at least two cylindrical housing members 206 and 208. Adjacent housing members 206 and 208 are located above and below the screen. The screen includes a screen frame (not shown) at the perimeter of the screen with a screen mesh or cloth (not shown) bonded to the screen frame in a taut state. The screen is horizontally oriented such that its screen mesh extends horizontally across the interior of the housing 204 to separate material deposited thereon by particle size and/or other selected characteristics. The gasket 202 is disposed on the screen frame of the screen in a sealing arrangement with the adjacent housing members 206, 208 (described in detail below with respect to FIGS. 4A-4C) for providing a fluid-tight seal between the screen and housing members 206, 208. A bolting mechanism, described in more detail below, may be employed to compress the adjacent housing members 206, 208 onto the gasket 202 disposed on a screen frame, in order to seal the interface between the screen frame and the adjacent housing members 206, 208. A vibration generator (not shown) driven by a motor 20 causes the elastically mounted housing 204 to vibrate at a desired frequency and amplitude for facilitating material screening or filtering. During operation of the separator 200, oversize particles of the separated material may exit the separator 200 via an oversize discharge outlet 28 present above the screen, while the undersize particles that pass through the screen exit the separator 200 via an undersize discharge outlet 32 present below the screen.

Figure 2B:
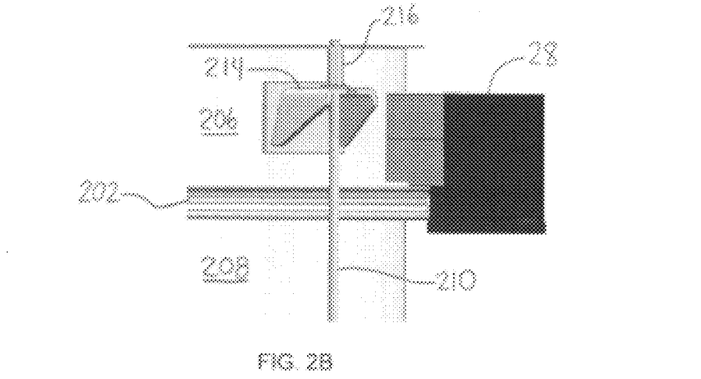
FIG. 2B is a close-up partial perspective view of a bolting mechanism for compressing the housing members of the separator, in accordance with an embodiment of the present invention.

A bolting mechanism, illustrated in FIGS. 2A and 2B, may be employed to sufficiently compress the adjacent housing members 206, 208 into sealing contact with the gasket 202 disposed on a screen frame, such that the gasket 202 elastically deforms to form a fluid-tight seal between the screen frame and the adjacent housing members 206, 208. The bolting mechanism may include one or more threaded bolts 210 exterior to the housing members 206, 208, wherein each bolt 210 is vertically oriented and connected to at least one housing member 206, 208. As depicted, one end of the bolt 210 may be fixedly connected to one housing member 208 via a flange hinge 212, while the other free end of the bolt 210 is connected to the other housing member 206 via a straight flange 214 and a threaded nut 216 screwed onto the free end of the bolt 210. The nut 216 on the bolt 210 may be tightened against the flange 214 to apply sufficient compression force on the adjacent housing members 206, 208 for deforming the gasket 202 so as to create a fluid-tight seal between the screen frame and housing members 206, 208 and, furthermore, for fixedly assembling the screen frame between the adjacent housing members 206, 208. Advantageously, the bolting mechanism described herein is simple and economic to fabricate without the aid of expensive or proprietary metal forming equipment typically required during fabrication of the annular clamp band utilized in the conventional vibratory separator as previously described. Moreover, the bolting mechanism described is just one example of a suitable bolting mechanism. Those skilled in the art will recognize that many other suitable bolting mechanisms or fastening systems may be economically constructed to apply a compressive force on the housing members 206, 208.

Figure 3A:
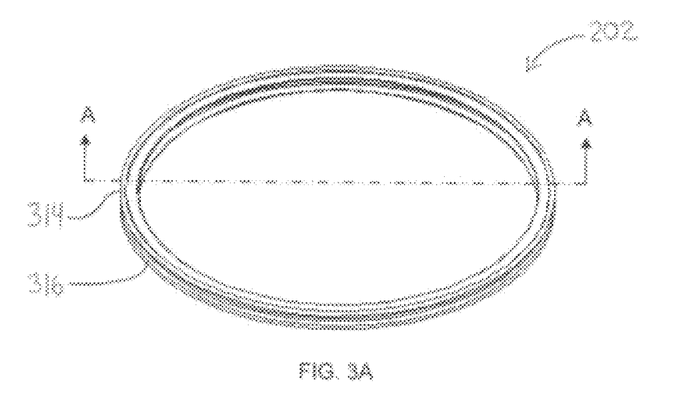
FIG. 3A is a perspective view of a gasket in accordance with an embodiment of the present invention.
Figure 3B:
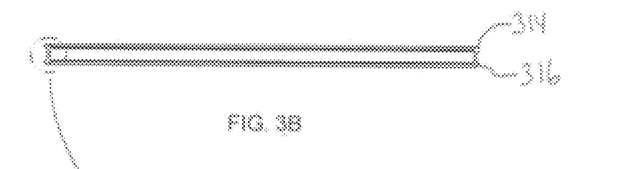
FIG. 3B is a cross-sectional view along line A-A of the gasket depicted in FIG. 3A.
Figure 3C:
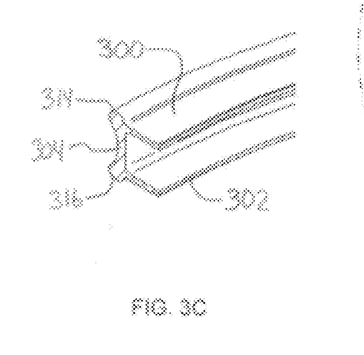
FIG. 3C is cross-sectional cut-away view of the gasket depicted in FIG. 3A.
Figure 3D:
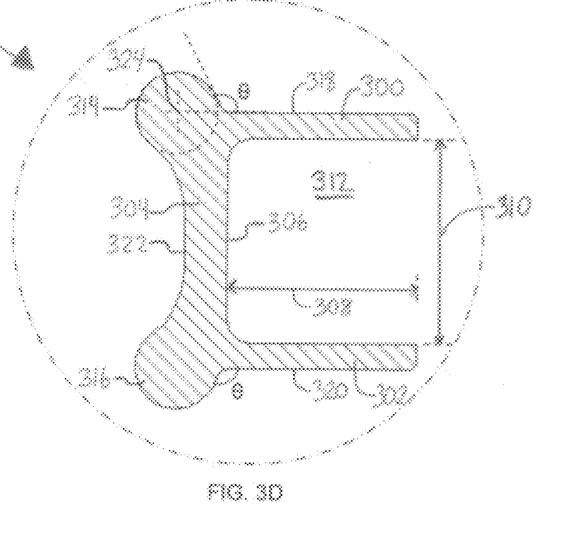
FIG. 3D is close-up cross-sectional view of the gasket depicted in FIG. 3B to illustrate the geometric details of the gasket.

Referring to FIGS. 3A-3D, in one embodiment, the gasket 202 is in the form of an annular ring. FIG. 3A is a perspective view of the gasket 202, FIG. 3B is a view of its cross-section along line A-A, whereas FIG. 3C is a cut-away view, and FIG. 3D is a close-up cross-sectional view to show the geometric details of the gasket 202. The annular gasket 202 includes an upper lip 300 and a lower lip 302, each of which extend radially inward from an annular wall 304. In particular, as illustrated in FIG. 3D, the upper and lower lips 300, 302 may extend generally perpendicularly from an interior surface 306 of the annular wall 304 by a first distance 308. The interior surface 306 of the annular wall 304 extends between the upper and lower lips 300, 302. The upper lip 300 and the lower lip 302 are spaced apart by a second distance 310 to form a U-shaped channel 312 with the interior surface 306 of the annular wall 304. The annular wall 304 terminates in a first lobe 314 at a top end of the annular wall 304 and a second lobe 316 at a bottom end of the annular wall 304. The first lobe 314 extends upwardly past a top surface 318 of the upper lip 300 such that the top surface 318 intersects the first lobe 314 at an angle θ greater than about 90 degrees. Likewise, the second lobe 316 extends downwardly past a bottom surface 320 of the lower lip 302 such that the bottom surface 320 intersects the second lobe 316 at an angle θ greater than about 90 degrees. In addition, each of the first and second lobes 314, 316 may protrude radially outward from an exterior surface 322 of the annular wall 304, which imparts a concave or generally curved shape to the exterior surface 322. The exterior surface 322 of the annular wall 304 extends between the first and second lobes 314, 316. Whereas, the interior surface 306 that extends between the upper and lower lips 300, 302 may be generally linear. The annular wall 304, the upper lip 300, and the lower lip 302 together have a pi-shaped (i.e., Π-shaped) cross-section.

The gasket 202 may comprise one or more elastomeric materials, thereby permitting elastic deformation of the gasket 202 under an applied compression force (as described in more detail below with respect to FIG. 4C). In particular, lobes 314, 316 comprise an elastomeric material to permit elastic deformation of the lobes 314, 316 under an applied compression force. Suitable elastomeric materials include fluoroelastomer, silicone, neoprene, nitrile, ethylene-propylene-diene monomer (EPDM), PTFE coated elastomers and combinations thereof. The entire gasket may be formed by any suitable process known to one of skill in the art. Suitable processes include extruding and molding processes. In one example, the entire gasket 202 may be formed from silicone using an injection molding process.

In one embodiment, each of the first and second lobes 314, 316 in cross-section, as depicted in FIG. 3D, may be generally circularly shaped as illustrated by the circular dashed line overlay on the first lobe 314. Furthermore, the top surface 318 of the upper lip 300 may be collinear with a centerpoint 324 of the circularly shaped lobe 314, as illustrated by the dashed line overlay that extends from the top surface 318 to the centerpoint 324. Likewise, the bottom surface 320 of the lower lip 302 may be collinear with a centerpoint of the circularly shaped lobe 316. However, those skilled in the art will recognize that the lobes 314, 316 are not restricted to a circular cross-section, but may have other cross-sectional shapes such as oval, elliptical, etc., for example.

In another embodiment, the top surface 318 of the upper lip and the bottom surface 320 of the lower lip may intersect the first and second lobes 314, 316, respectively, at an angle θ greater than about 90 degrees and less than about 180 degrees. In another embodiment, the angle θ may be in a range from about 91 to about 160 degrees. In yet another embodiment, the angle θ may be in a range from about 95 to about 140 degrees. In still yet another embodiment, the angle θ may be in a range from about 100 to about 130 degrees. The angle θ used to may be dependent, in part, upon the elastic properties (e.g., Young's modulus) of material used to fabricate the lobes 314, 316. The angle θ may be dependent, in part, upon the Shore A durometer of the lobes 314, 316. Shore hardness is a measure of the resistance of material to indentation by 3 spring-loaded indenter. The higher the number, the greater the resistance. The hardness testing of plastics is most commonly measured by the Shore (Durometer) test or Rockwell hardness test. Both methods measure the resistance of the plastic toward indentation. Both scales provide an empirical hardness value that doesn't correlate to other properties or fundamental characteristics. Shore Hardness, using either the Shore A or Shore D scale, is the preferred method for rubbers/elastomers and is also commonly used for 'softer' plastics such as polyolefins, fluoropolymers, and vinyls. The Shore A scale is used for 'softer' rubbers while the Shore D scale is used for 'harder' ones. The shore A Hardness is the relative hardness of elastic materials such as rubber or soft plastics can be determined with an instrument called a Shore A durometer. If the indenter completely penetrates the sample, a reading of 0 is obtained, and if no penetration occurs, a reading of 100 results. The reading is dimensionless. In some embodiments the Shore A durometer of the lobes 314, 316 is 20 to 70. In other embodiments, the Shore A durometer of the lobes 314, 316 is 30 to 65. In yet other embodiments, the Shore A durometer of the lobes 314, 316 is 35 to 60.

Figure 4A:
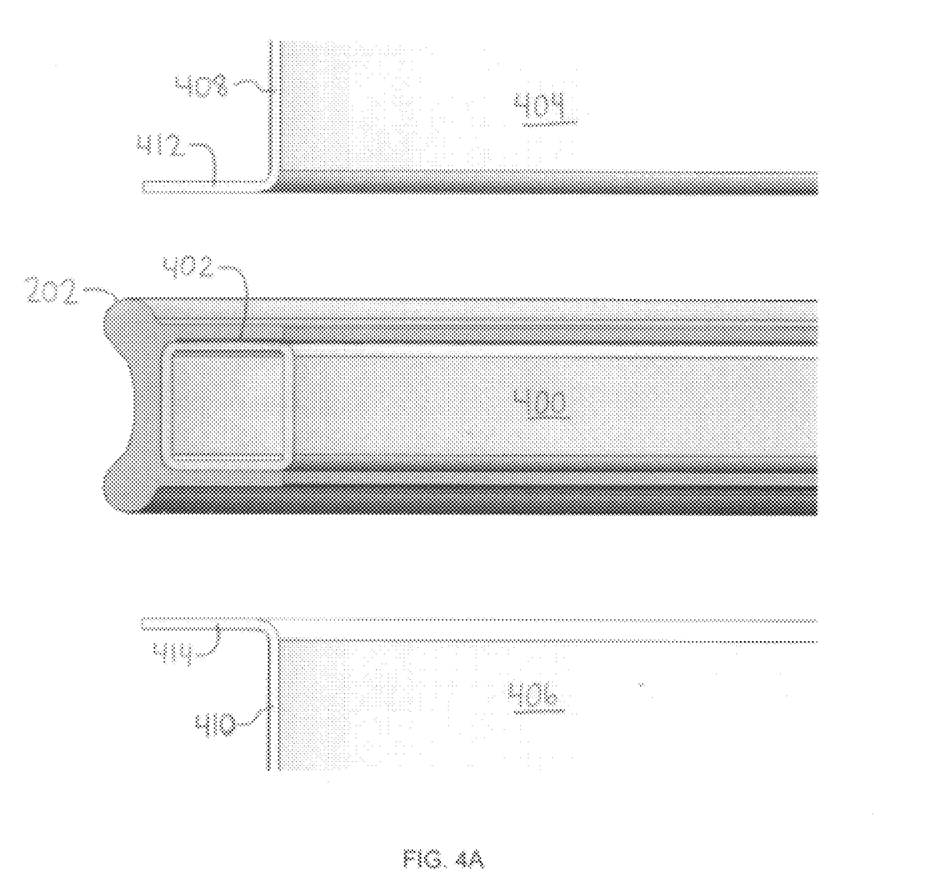
FIG. 4A is a cross-sectional cut-away view of a gasket disposed on a screen frame between adjacent housing members of a round separator, in accordance with an embodiment of the present invention.

First and second distances 308, 310, which define the height and depth dimensions of the U-shaped channel 312, are sufficient to receive a screen frame and any screen mesh or cloth attached at its perimeter to the screen frame, as illustrated in FIG. 4A. FIG. 4A illustrates a cross-sectional cutaway view of the gasket 202 disposed on a screen frame 400 with a screen mesh 402 attached thereto. The gasket 202 is between adjacent housing members 404, 406 (formerly housing members 206, 208 in FIG. 2A) of a round separator, in accordance with one embodiment of the present invention. In this embodiment, each of the distances 308, 310 is sufficiently sized to fully enclose three sides of the screen frame 400.

As illustrated in FIG. 4A, the screen frame 400 may have a rectangular cross-section which advantageously permits economic fabrication of the screen frame 400 (and screen) without the aid of expensive or proprietary metal forming equipment. Examples of suitable screen frame cross-section geometries include rectangular and square, for example. Although the screen frame 400 may be fabricated from any suitable material, the screen frame 400 is normally fabricated from a metallic material such as aluminum or steel, for example. During fabrication of a screen, a screen mesh/cloth 402 may be bonded to the screen frame 400 in a taut state. Furthermore, the screen frame 400 may be fabricated from commercially available square tubing (i.e., tubing have a square cross-section) which is both readily available and inexpensive. Thus, screens, which are frequently replaced during normal operation of a separator, can be relatively easily and inexpensively fabricated with a square or rectangular cross-section screen frame 400, as opposed to requiring proprietary or expensive ring rolling equipment normally used in the fabrication of conventional screen frames, as previously discussed.

FIG. 4A also illustrates the construction of the adjacent housing members 404, 406 about the gasket 202 disposed on the screen frame 400 and screen mesh 402 of a screen. The screen mesh 402 is normally bonded to a top surface and/or a bottom surface of the screen frame 402 such that a perimeter of the screen mesh may be present between the gasket 202 and one or more surfaces (e.g., top surface) of the screen frame 400. Each of the housing members 404, 406 has a vertically-oriented cylindrical wall 408, 410 that terminates at one or both ends in a planar radial flange 412, 414. In one embodiment, as depicted in FIG. 4A, the planar radial flanges 412, 414 extend horizontally outward from the cylindrical wall 408, 410, respectively, such that the plane of the radial flange 412 is generally perpendicular to the vertically-oriented cylindrical wall 408 and the plane of the radial flange 414 is generally perpendicular to the vertically-oriented cylindrical wall 410. In this embodiment, each of the radial flanges 412, 414 is both planar and flat. As such, housing members 404, 406 are much simpler to form and can be economically fabricated without the aid of the expensive or proprietary metal forming equipment typically required to form the non-planar angled flanges of conventional housing members as previously discussed.

Figure 4B:
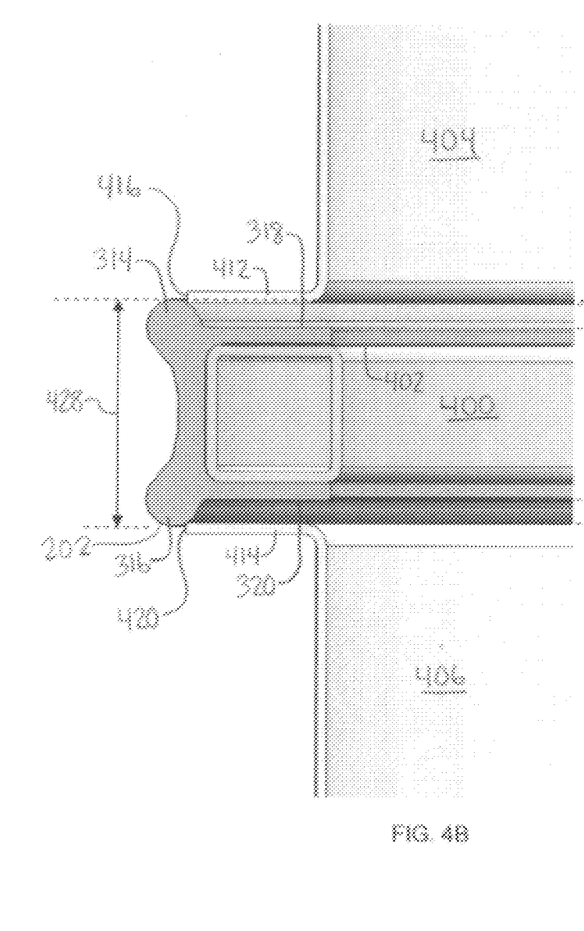
FIG. 4B is a cross-sectional cut-away view of the gasket depicted in FIG. 4A to illustrate the gasket providing alignment of the adjacent housing members during assembly of the separator, in accordance with an embodiment of the present invention.
Figure 4C:
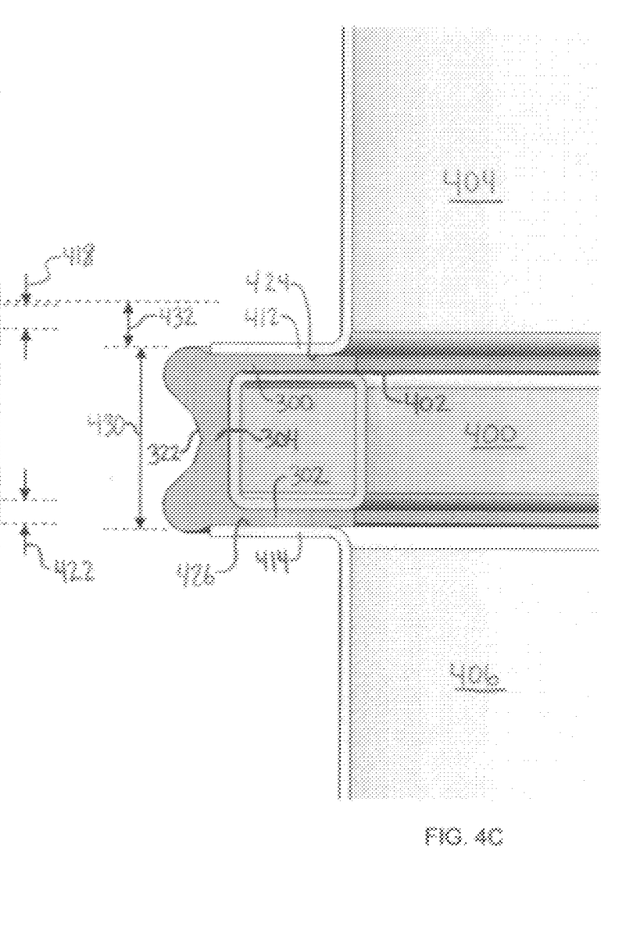
FIG. 4C is a cross-sectional cut-away view of the gasket depicted in FIG. 4A to illustrate the gasket providing sealing between the adjacent housing members and the screen frame after compressing the adjacent housing members during assembly of the separator, in accordance with an embodiment of the present invention.

FIGS. 4B and 4C illustrate the alignment and sealing of the adjacent housing members 404, 406 about the gasket 202 disposed on the screen frame 400 and screen mesh 402 described with respect to in FIG. 4A. During alignment, as depicted in FIG. 4B, housing members 404, 406 are placed onto the first and second lobes 314, 316 of the gasket 202 which centers the housing members 404, 406 on the gasket 202 and, thereby, mutually aligns the housing members 402, 404. During alignment, an end 416 of the flange 412 of the upper housing member 404 contacts the first lobe 314 such that a first space 418 is provided between the flange 412 and the top surface 318 of the upper lip of the gasket. Likewise, an end 420 of the flange 414 of the lower housing member 406 contacts the second lobe 316 such that a second space 422 is provided between the flange 414 and the bottom surface 320 of the lower lip of the gasket. Thus, the lobes 314, 316 provide a centering device for properly centering the upper and lower housing members 404, 406 onto the gasket which, thereby, also mutually aligns the upper and lower housing members 404, 406.

After alignment of the housing members 404, 406, a compression force acting in a direction normal to the plane of the flanges 412, 414 is applied to the upper and lower adjacent housing members 404, 406 which causes the housing members 404, 406 to move towards each other until the flanges 412, 414 of the housing members 404, 406 are fully seated and in sealing contact with the upper and lower lips 300, 302 of gasket 202, as illustrated in FIG. 4C. Under a sufficient compression force, the flange 412 deforms the first lobe 314 by compressing the lobe 314 radially outward while the flange 412 traverses the first space 418 until the space 418 is extinguished and a bottom surface 424 of the flange 412 comes into full sealing contact with the top surface 318 of the upper lip 300 of the gasket. Concomitantly, the flange 414 deforms the second lobe 316, by compressing the lobe 316 radially outward, while traversing the second space 422 until the space 422 is extinguished and a top surface 426 of the flange 414 comes into full sealing contact with the bottom surface 320 of the lower lip 302 of the gasket. When compressed, the top of the first lobe 314 may extend past the bottom surface 424 of the flange 412 thereby forming a lip seal with the edge 416 of the flange 412. Likewise, when compressed, the bottom of the second lobe 316 may extend past the top surface 426 of the flange 414 thereby forming a lip seal with the edge 420 of the flange 414.

As such, during compression of the housing members 404, 406, the annular wall 304 deforms and changes in height from a first height 428 to a second height 430, thereby decreasing in height by a distance 432. A comparison of FIGS. 4B and 4C illustrate that the exterior surface 322 of the annular wall 304 may become more concave due to the radially-outward directed deformation of the lobes 314, 316. In the compressed state, depicted in FIG. 4C, the gasket 202 is compressed between the upper and lower housing members 404, 406 and the screen frame 400 thereby forming a seal between the screen and housing members.

In the compressed state, each of the elastically deformed lobes 314, 316 exerts an inwardly-directed radial force on the edges 416, 420 of the flanges 412, 414, respectively, due to the potential energy stored during deformation of the lobes 314, 316. The radial force exerted by the elastically deformed lobes 314, 316 on the edges 416, 420 is sufficient to prevent any lateral motion or misalignment of the housing members 404, 406 that may otherwise occur due to vibration during operation of the separator. As a result, the gasket 202 of the present invention advantageously permits use of adjacent housing members 404, 406 having flat planar flanges 412, 414 which are much simpler to form without the aid of expensive or proprietary metal forming equipment, as compared to non-planar angled flanges typically required to prevent lateral motion and misalignment of housing members during operation (e.g., vibration) of a conventional vibratory separator.

Furthermore, the use of adjacent housing members 404, 406 having flat planar flanges 412, 414 also advantageously permits alternative and more economic means for applying sufficient compression force to the housing members 404, 406, as compared to the U-shaped annular clamp band typically utilized to compress the housing members during operation of a conventional vibratory separator. One example of an alternative and more economic means for applying a compression force to the housing members 404, 406 is the bolting mechanism previously described with respect to FIGS. 2A and 2B.

While the foregoing is directed to embodiments of the present invention, other and further embodiments of the invention may be devised without departing from the basic scope thereof and the scope thereof is determined by the claims that follow.

What is claimed is:

1. A gasket sealing system for aligning and sealing a screen in a round separator, comprising:
   a gasket comprising a deformable annular wall having a first lobe at a top end, a second lobe at a bottom end, an exterior surface, and an interior surface from which an upper lip and a lower lip project inward to generally define a U-shaped channel, wherein a top surface of the upper lip intersects the first lobe at an angle greater than about 90 degrees, and wherein a bottom surface of the lower lip intersects the second lobe at an angle greater than about 90 degrees;
   a screen having a screen frame disposed within the U-shaped channel of the gasket;
   an upper housing member having a first flange disposed above and generally parallel to the top surface of the upper lip of the gasket; and
   a lower housing member having a second flange disposed below and generally parallel to the bottom surface of the lower lip of the gasket.

2. The gasket sealing system of claim 1, wherein the upper lip and the lower lip extend generally perpendicularly from the interior surface of the annular wall.

3. The gasket sealing system of claim 1, wherein the first and second lobes have a circular cross-section.

4. The gasket sealing system of claim 1, wherein the deformable annular wall of the gasket comprises an elastically deformable material.

5. The gasket sealing system of claim 1, wherein the first and second lobes comprise an elastically deformable material.

6. The gasket sealing system of claim 1, wherein the screen frame has a rectangular-shaped cross-section.

7. The gasket sealing system of claim 1, wherein the exterior surface that extends from the first lobe to the second lobe is generally curved.

8. The gasket sealing system of claim 1, wherein the interior surface that extends between the upper and lower lips is generally linear.

9. The gasket sealing system of claim 1, wherein an end of the first flange contacts the first lobe and an end of the second flange contacts the second lobe such that the relative positions of the ends of the first and second flanges are substantially vertically aligned.

10. The gasket sealing system of claim 1, wherein an end of the first flange contacts the first lobe such that a first space is provided between the first flange and the upper lip of the gasket, and wherein an end of the second flange contacts the second lobe such that a second space is provided between the second flange and the lower lip of the gasket, and wherein the relative positions of the ends of the first and second flanges are substantially vertically aligned.

11. The gasket sealing system of claim 10, wherein under a compression force applied to the first and second flanges, the first lobe is configured to deform so as to permit sealing contact between the first flange and the upper lip of the gasket, and the second lobe is configured to deform so as to permit sealing contact between the second flange and the lower lip of the gasket.

12. The gasket sealing system of claim 11, wherein the deformed first and second lobes are adapted to exert a force on the first and second flanges so as to prevent lateral motion of the upper and lower housing members.

13. A gasket sealing system for aligning and sealing a screen in a round separator, comprising:
- a gasket comprising a deformable annular wall having a first lobe at a top end, a second lobe at a bottom end, an exterior surface, and an interior surface from which an upper lip and a lower lip project inward to generally define a U-shaped channel, wherein the deformable annular wall, the upper lip, and the lower lip together have a pi-shaped cross-section;
- a screen having a screen frame disposed within the U-shaped channel of the gasket;
- an upper housing member having a first flange disposed above and generally parallel to a top surface of the upper lip of the gasket; and
- a lower housing member having a second flange disposed below and generally parallel to a bottom surface of the lower lip of the gasket.

14. The gasket sealing system of claim 13, wherein the upper lip and the lower lip extend generally perpendicularly from the interior surface of the annular wall.

15. The gasket sealing system of claim 13, wherein the top surface of the upper lip intersects the first lobe at an angle greater than about 90 degrees, and wherein the bottom surface of the lower lip intersects the second lobe at an angle greater than about 90 degrees.

16. The gasket sealing system of claim 13, wherein the first and second lobes have a circular cross-section.

17. The gasket sealing system of claim 13, wherein the first and second lobes comprise an elastically deformable material.

18. The gasket sealing system of claim 13, wherein the screen frame has a rectangular-shaped cross-section.

19. The gasket sealing system of claim 13, wherein the exterior surface that extends from the first lobe to the second lobe is generally curved.

20. The gasket sealing system of claim 13, wherein the interior surface that extends between the upper and lower lips is generally linear.

21. The gasket sealing system of claim 13, wherein an end of the first flange contacts the first lobe and an end of the second flange contacts the second lobe such that the relative positions of the ends of the first and second flanges are substantially vertically aligned.

22. The gasket sealing system of claim 13, wherein an end of the first flange contacts the first lobe such that a first space is provided between the first flange and the upper lip of the gasket, and wherein an end of the second flange contacts the second lobe such that a second space is provided between the second flange and the lower lip of the gasket, and wherein the relative positions of the ends of the first and second flanges are substantially vertically aligned.

23. The gasket sealing system of claim 22, wherein under a compression force applied to the first and second flanges, the first lobe is configured to deform so as to permit sealing contact between the first flange and the upper lip of the gasket, and the second lobe is configured to deform so as to permit sealing contact between the second flange and the lower lip of the gasket.

24. The gasket sealing system of claim 23, wherein the deformed first and second lobes are adapted to exert a force on the first and second flanges so as to prevent lateral motion of the upper and lower housing members.

* * * * *